United States Patent Office 3,459,741
Patented Aug. 5, 1969

3,459,741
1-CYCLOBUTENO-(3',4';6α,7α) DERIVATIVES OF THE ANDROSTANE AND PREGNANE SERIES
John H. Fried, Palo Alto, Calif., assignor to Syntex Corporation, Panama, Panama, a corporation of Panama
No Drawing. Filed Sept. 6, 1966, Ser. No. 577,162
Int. Cl. C07c 169/34, 169/22, 169/10
U.S. Cl. 260—239.55
23 Claims

ABSTRACT OF THE DISCLOSURE

Disclosed are, as new compounds, steroid derivatives of the androstane, 19-norandrostane, pregnane and corticoid series which contain a novel 1'-cyclobuteno grouping at position C–6α,7α of the steroid nucleus. This 1'-cyclobuteno grouping can be mono-substituted on the C–1' or C–2' carbon atoms with cyano, carboxy or carboalkoxy or it can be substituted on both of the C–1' and C–2' carbon atoms with a cyano, carboxy or carboalkoxy group. The steroid nucleus further contains optional substituents and unsaturation. Also disclosed is a process for preparing these 1-cyclobuteno-(3',4';6α,7α) steroids by irradiating with ultraviolet light a 3-keto-Δ$^{4,6}$ starting steroid and a mono- or di-substituted acetylene in an inert solvent. The product steroids are anabolic, progestational and cortical agents.

This invention relates to novel steroids and to a method for the preparation thereof. More specifically, this invention relates to steroids of the androstane and pregnane series containing a cyclobuteno moiety fused to the C–6 and C–7 carbon atoms of the steroid nucleus. Specifically, it relates to novel 1'-cyclobuteno-(3',4';6α,7α) derivatives of the androstane and pregnane series, the 19-nor and Δ$^1$ analogs thereof, and a novel process for the preparation thereof. The novel portion of the steroidal molecule may be shown by the partial representation of the A and B rings:

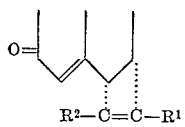

wherein each of R$^1$ and R$^2$ independently is an electronegative group such as cyano, carboxy, carboalkoxy or the like.

By the term carboalkoxy is meant the group —COOR in which R is a straight or branched chain alkyl group containing from 1 to 4 carbon atoms inclusive.

The novel 1'-cyclobuteno moiety is introduced at the C–6 and C–7 position of the steroid nucleus by the photochemical addition of an acetylene of the formula $$R^1C \equiv CR^2$$

in which each of R$^1$ and R$^2$ independently is carboxy, carboalkoxy, or cyano, to a 3-keto-Δ$^{4,6}$-diene of the androstane or pregnane series.

In the practice of the process, the 3-keto-Δ$^{4,6}$-diene and an acetylene of the formula R$^1$C≡CR$^2$, wherein R$^1$ and R$^2$ are as defined hereinabove, are irradiated with ultraviolet light of a wave length in the range of about 270 to 330 mμ in the presence of an inert organic solvent such as benzene, dioxane and the like, but preferably benzene. Under these conditions, the photochemical addition of the acetylene occurs at the 4,5 and 6,7 double bonds to afford a mixture of addition products. The orientation of the resulting 4,5 and 6,7 cyclobuteno moieties, with respect to the steroid nucleus, are both alpha and beta. Additionally, in the case of unsymmetrically substituted acetylenes, a cross mixture of products is routinely obtained. In the practice of this process, the mixture of products is separated by conventional techniques, for example, column chromatography, to yield the desired cyclobuteno-(3',4'; 6α,7α) compounds of the present invention.

The following list is representative of the acetylenes for the photochemical addition reaction:

acetylene dicarboxylic acid,
propiolic acid,
ethyl propiolate,
diethyl acetylenedicarboxylate,
dimethyl acetylenedicarboxylate,
cyano acetylene,
dicyano acetylene.

In the practice of the process, the substituted acetylenes, which are either liquids or solids at room temperature, are dissolved in the inert solvent prior to the photochemical reaction. This reaction may be represented as follows. The 3-keto-Δ$^{4,6}$-dienes used as starting materials in the process of this invention are readily available compounds. In addition, the compounds may contain a 6-chloro, a 6-fluoro, or a 6-methyl substituent. In those products containing the above 6-substituent, the orientation of the preferred cyclobuteno compounds is alpha and the orientation of the 6-substituent is beta.

Included in this interesting series of compounds of the present invention, are steroids of the androstane and pregnane series which contain additional substituents and groupings known to those skilled in the art. For example, in the androstane series of compounds, including the 19-nor analogs, such known groupings as a 3-keto-Δ$^4$-ene, and elaborations of the 3-keto group, e.g. a 3β-hydroxy, a 3β-ether, such as tetrahydropyran-2-yloxy, tetrahydrofuran-2-yloxy or a 3β-ester, such as acetoxy, propionoxy and the like, are encompassed. A 1-dehydro system and a 6-substituent, such as chloro, fluoro or methyl, is also included in this series. In addition, substituents such as a 17-keto group or elaborations thereof, e.g. a 17α-lower alkyl, alkenyl, or alkynyl substituents, a 17β-ol and functional derivatives of the 17β-ol, e.g. a 17β-ester or a 17β-ether such as mentioned hereinbefore for the 3β-ether and 3β-ester, are encompassed in this invention. Preferably, the compounds of the androstane and 19-nor androstane series contain the 3-keto-Δ$^4$-ene grouping in combination with a 17β-ol and a 17α-methyl, a 17α-ethyl, a 17α-vinyl or a 17α-ethynyl substituent. These substituents are introduced by conventional techniques subsequent to those reactions introducing the furano moiety.

Illustrative of the novel cyclobuteno-(3',4';6α,7α) steroids of the androstanes containing the above combination and elaborations of known substituents, are those compounds shown by the following representative Formula A:

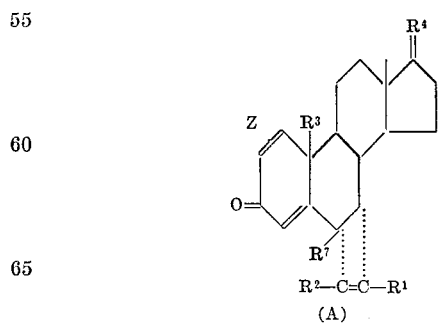

(A)

wherein Z is a carbon-carbon single bond or a carbon-carbon double bond;

Each of R$^1$ and R$^2$ independently is carboxy, carboalkoxy or cyano;

$R^3$ is hydrogen or methyl, $R^3$ being methyl when Z is the carbon-carbon double bond;

$R^4$ is keto or the group $$\begin{array}{c} OR^5 \\ | \cdots R^6 \end{array}$$

in which $R^5$ is hydrogen, tetrahydropyran-2-yl, tetrahydrofuran-2-yl or a hydrocarbon carboxylic acyl group of less than 12 carbon atoms and $R^6$ is hydrogen, lower alkyl, alkenyl, alkynyl or haloalkynyl; and $R^7$ is hydrogen, chloro, fluoro or methyl.

The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, acyloxy containing up to 12 carbon atoms, nitro, amino, halogeno and the like. Typical esters thus include acetate, propionate, enanthate, benzoate, trimethylacetate, t-butyl-acetate, phenoxyacetate, cyclopentylpropionate, amino-acetate, β-chloropropionate, adamantoate, and the like.

The above steroids of partial Formula A and of the androstane and 19-norandrostane series, are anabolic agents having a favorable anabolic-androgen ratio and are useful post-operatively and in geriatrics to enhance tissue build-up. In addition, the above steroids of the androstane and 19-norandrostane series, bearing a 17α-ethynyl, vinyl or ethyl substituent, are progestational agents and are useful in oral contraception.

Representative of the 3-keto-Δ⁴,⁶-dienes of the androstane series used in the process of the present invention for the preparation of anabolic agents, are the following compounds:

androsta-4,6-diene-3,17-dione;
17α-methyl-17β-hydroxyandrosta-4,6-dien-3-one;
17α-ethynyl-17β-acetoxy-19-norandrosta-4,6-dien-3-one;
17β-(tetrahydropyran-2'-yloxy)-androsta-4,6-dien-3-one;
17β-acetoxy-19-norandrosta-4,6-dien-3-one;
17α-ethyl-17β-hydroxyandrosta-4,6-dien-3-one;
17α-ethyl-17β-hydroxy-19-norandrosta-4,6-dien-3-one;
17α-vinyl-17β-(tetrahydropyran-2'-yloxy)-androsta-4,6-dien-3-one;
6-fluoroandrosta-4,6-dien-3-one;
6-methyl-17β-hydroxyandrosta-4,6-dien-3-one;
6-chloro-17β-hydroxy-19-norandrosta-4,6-dien-3-one; and
17α-chloroethynyl-17β-hydroxy-19-norandrosta-4,6-dien-3-one.

In the practice of preparing the anabolic agents of the present invention, the 1-dehydro system is introduced subsequent to the photochemical reaction by treatment with 2,3-dichloro-5,6-dicyanobenzoquinone. Otherwise, all substituents are present in the 3-keto-Δ⁴,⁶-diene starting material before the process of the invention.

In addition to the standard 3-keto-Δ⁴-ene grouping and elaborations of the 3-keto group as described hereinabove for the androstane series, in the pregnane and 19-norpregnane series of novel cyclobuteno steroids, such additional groupings or combinations of groupings are present, which are known to those skilled in the art. The novel cyclobuteno steroids of this series contain, for example, a 16-substituent such as alkyl, alkylene, hydroxy or the like, preferably a 16α-methyl, a 16β-methyl, a 16α-hydroxy or a 16-methylene in combination with a 17β-acetyl substituent, a 17α-hydroxy-17β-acetyl grouping and elaborations of the latter, such as the known 17α-esters, such as 17α-acetoxy, 17α-caproyloxy and the like, and a 16α,17α-dihydroxy combination and its elaborations, such as the 16α,17α-acetonide. The grouping includes a 1-dehydro system. In addition, the steroids of the pregnane series contain a 6-substituent such as a 6-chloro, a 6-fluoro or a 6-methyl substituent.

Steroids of the pregnane series containing the cyclobuteno moiety and above combinations and elaborations at the 1, 2, 3, 6, 16, 17, and 21 positions of the steroid nucleus, are progestational agents with anti-estrogenic activity and are useful in fertility control and the management of various menstrual disorders. Preferably, the cyclobuteno steroids, demonstrating progestational activity, contain a 3-keto-Δ⁴-ene grouping in combination with a 6-substituent, such as chloro, fluoro or methyl, a 17α-hydroxy group and its 17α-acyloxy elaborations, a 16α,17α-dihydroxy grouping and its 16α,17α-ketal elaborations, or a 16-methyl substituent along with the 17α-hydroxy or 17α-acyloxy group.

Illustrative of the novel cyclobuteno-(3',4';6α,7α) steroids of the pregnane series, demonstrating hormonal activities characteristic of progestational agents, are those compounds shown by the following representative Formula B:

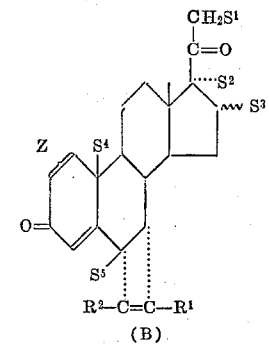

(B)

wherein Z is a carbon-carbon single bond, a carbon-carbon double bond or a 1α,2α-methylene group;

Each of $R^1$ and $R^2$ independently is carboxy, carboalkoxy or cyano;

$S^1$ is hydrogen, chloro or fluoro;

$S^2$ is hydrogen, hydroxy, lower alkyl or a hydrocarbon carboxylic acyloxy group containing less than 12 carbon atoms;

$S^3$ is hydrogen, α-methyl, β-methyl, α-hydroxy or methylene;

$S^2$ and $S^3$ together is the group

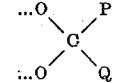

in which P is hydrogen or lower alkyl and Q is hydrogen, lower alkyl or aryl of up to 8 carbon atoms;

$S^4$ is hydrogen or methyl, $S^4$ being methyl when Z is the carbon-carbon double bond; and $S^5$ is hydrogen, chloro, fluoro or methyl.

Representative of the 3-keto-Δ⁴,⁶-dienes of the pregnane series used in the process of the present invention for the preparation of progestational agents, are the following compounds:

pregna-4,6-diene-3,20-dione;
19-norpregna-4,6-diene-3,20-dione;
21-fluoropregna-4,6-diene-3,20-dione;
17α-acetoxypregna-4,6-diene-3,20-dione;
17α-hydroxypregna-4,6-diene-3,20-dione;
16α,17α-isopropylidene-dioxypregna-4,6-diene-3,20-dione;
16α,17α-isopropylidenedioxy-19-norpregna-4,6-diene-3,20-dione;
17α-caproyloxy-19-norpregna-4,6-diene-3,20-dione;
17α-methyl-19-norpregna-4,6-diene-3,20-dione;
6-chloropregna-4,6-diene-3,20-dione;
6-chloro-19-norpregna-4,6-diene-3,20-dione;
6-fluoropregna-4,6-diene-3,20-dione;
6-fluoro-19-norpregna-4,6-diene-3,20-dione;
6-methylpregna-4,6-diene-3,20-dione;
6-methyl-19-norpregna-4,6-diene-3,20-dione;

1α,2α-methylenepregna-4,6-diene-3,20-dione; and 16-methylenepregna-4,6-diene-3,20-dione.

In the practice of preparing the progestational compounds of the present invention, the 1-dehydro system is introduced subsequent to the photochemical reaction by treatment with 2,3-dichloro-5,6-dicyanobenzoquinone. Otherwise, all substituents are present in the 3-keto-Δ⁴,⁶-diene starting material before the process of the present invention.

Also, the novel cyclobuteno-(3',4';6α,7α) steroids of the pregnane series contain combinations and elaborations involving an 11β-hydroxy group, a 9α-fluoro group, a 1-dehydro system, a 6-substituent such as chloro, fluoro or methyl, a 16-substituent, such as an α-hydroxy, methyl or methylene group, a 16α,17α-dihydroxy grouping and its elaborations, a 16α,17α-acetonide or other 16α,17α-ketals, a 17α,21-dihydroxy-20-one side chain and elaborations thereof, such as a 17,20;20,21-bismethylenedioxy protecting group, for example, a 21-ester, a 21-ether or a 17α-acyloxy group.

The cyclobuteno-(3',4';6α,7α) novel steroids possessing the latter combination and elaboration of substituents are cortical hormones with high anti-inflammatory and low catabolic activities and are useful in the treatment of rheumatoid arthritis, contact dermatitis, allergies and the like. These compounds may be administered via usual routes in the standard pharmaceutical compositions and at dosages appropriate for the particular condition being treated.

Preferably, the cyclobuteno-(3',4';6α,7α) steroids, demonstrating anti-inflammatory activity, contain a 3-keto-Δ⁴-ene grouping and elaborations of the 3-keto group, in combination with an 11β-hydroxy group, a 9α-hydrogen or fluoro substituent, a 1-dehydro system, a 6-chloro, fluoro or methyl substituent, a 17α,21-dihydroxy grouping and its acyloxy elaborations, a 16-methyl substituent or a 16α,17α-dihydroxy grouping and its 16α,17α-acetonide elaboration.

Illustrative of the novel cyclobuteno-(3',4';6α,7α) steroids of the pregnane series, demonstrating hormonal activity characteristic of corticoids, and containing the above combinations and elaborations of known substituents, are those compounds shown by the following representative formula:

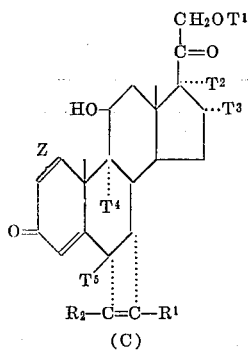

(C)

wherein Z is a carbon-carbon single bond or a carbon-carbon double bond;

Each of $R^1$ and $R^2$ independently is carboxy, carboalkoxy or cyano;

$T^1$ is hydrogen, tetrahydropyran-2-yl, tetrahydrofuran-2-yl or a hydrocarbon carboxylic acyl group containing less than 12 carbon atoms;

$T^2$ is hydrogen, hydroxy or a hydrocarbon carboxylic acid acyloxy group containing less than 12 carbon atoms;

$T^3$ is hydrogen, hydroxy or methyl;

$T^2$ and $T^3$ together is the group

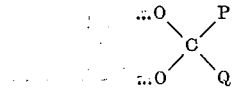

in which P is hydrogen or lower alkyl and Q is hydrogen, lower alkyl or aryl of up to 8 carbon atoms;

$T^4$ is hydrogen or fluoro; and $T^5$ is hydrogen, chloro, fluoro or methyl.

Representative of the 3-keto-Δ⁴,⁶-diene of the pregnane series used in the process of the present invention for the preparation of cortical hormones, are the following compounds:

6-dehydrocortisol;
9α-fluoro-11β,17α,21-trihydroxypregna-4,6-diene-3,20-dione;
16α-methyl-11β-,17α,21-trihydroxypregna-4,6-diene-3,20-dione;
9α-fluoro-16α-methyl-11β,17α,21-trihydroxypregna-4,6-diene-3,20-dione;
9α-fluoro-11β,21-dihydroxy-16α,17α-acetonidepregna-4,6-diene-3,20-dione;
6-fluoro-11β,17α,21-trihydroxypregna-4,6-diene-3,20-dione;
6-fluoro-16α-methyl-11β,17α,21-trihydroxypregna-4,6-diene-3,20-dione;
6,9α-difluoro-11β,17α,21-trihydroxypregna-4,6-diene-3,20-dione;
6,9α-difluoro-16α-methyl-11β,17α,21-trihydroxypregna-4,6-diene-3,20-dione;
6-methyl-9α-fluoro-16α,17α-acetonide-21-acetoxypregna-4,6-diene-3,20-dione;
6-chloro-16α,17α-acetonide-21-acetoxypregna-4,6-diene-3,20-dione;
11β-hydroxy-17,20;20,21-bismethylenedioxypregna-4,6-dien-3-one;
9α-fluoro-11β,17α-dihydroxy-16α-methyl-21-(tetrahydropyran-2'-yloxy)-pregna-4,6-diene-3,20-dione; and
6,9α-difluoro-11β-hydroxy-16α-methyl-17α,21-diacetoxypregna-4,6-diene-3,20-dione.

In the practice of preparing the cortical hormones, the 1-dehydro system is introduced subsequent to the photochemical reaction by treatment with 2,3-dichloro-5,6-dicyanobenzoquinone. Otherwise, all substituents are present in the 3-keto-Δ⁴,⁶-diene starting material before the process of the invention.

In addition, the novel substituted 1'-cyclobuteno-(3',4';6α,7α) compounds of the present invention, serves as intermediates for the preparation of substituted cyclobutano compounds, and preparation of the unsubstituted cyclobuteno compounds. For example, convention hydrogenation over a palladium-on-calcium carbonate converts the substituted cyclobuteno compound to the substituted cyclobutano compound.

A thus-obtained 1,2-dicarboxy cyclobutano compound may be oxidized with lead tetraacetate to form a corresponding 1'-cyclobuteno-(3',4';6α,7α) compound. A carboalkoxy group and a cyano group in the cyclobuteno-(3',4';6α,7α) moiety is hydrolyzed via conventional techniques to afford a carboxy group in the cyclobuteno moiety. Preferably, sodium bicarbonate in aqueous dioxane is used for the hydrolysis of the ester; aqueous hydrochloric acid or sodium hydroxide is preferred for the hydrolysis of the nitrile group.

The following examples serve to illustrate the invention but are not necessarily intended to limit the scope thereof.

EXAMPLE 1

1',2'-dicarbomethoxy-1'-cyclobuteno-(3',4';6α,7α)-androstanes and 19-nor analogs A mixture of 2 g. of 17α-methyl-17β-hydroxy-19-norandrosta-4,6-dien-3-one and 2 g. of dimethyl acetylenedicarboxylate in 140 ml. of benzene is irradiated with a 200 watt Hanau high pressure mercury vapor lamp with a Pyrex filter at room temperature while bubbling acetylene through the solution for a period of 3 hours. At the end of the reaction, the mixture is evaporated in vacuo to dryness, chromatographed on silica and the product eluted with ethyl acetate:benzene to yield 1',2'-dicarbomethoxy-1'-cyclobuteno - (3',4';6α,7α)-17α-methyl - 17β-hydroxy-19-norandrost-4-en-3-one which is recrystallized from methanol:methylene chloride.

In a similar manner,

17α-methyl-17β-hydroxyandrosta-4,6-dien-3-one;
17α-ethynyl-17β-hydroxyandrosta-4,6-dien-3-one;
17α-ethynyl-17β-hydroxy-19-norandrosta-4,6-dien-3-one;
17β-hydroxyandrosta-4,6-dien-3-one; and
17β-hydroxy-19-norandrosta-4,6-dien-3-one, are converted to the corresponding 1',2'-dicarbomethoxy-1'-cyclobuteno-(3',4';6α,7α) compounds, namely 1',2'-dicarbomethoxy-1'-cyclobuteno-(3',4';6α,7α)-17α-methyl-17β-hydroxyandrost-4-en-3-one;
1',2'-dicarbomethoxy-1'-cyclobuteno-(3',4';6α,7α)-17α-ethynyl-17β-hydroxyandrost-4-en-3-one;
1',2'-dicarbomethoxy-1'-cyclobuteno-(3',4';6α,7α)-17α-ethynyl-17β-hydroxy-19-norandrost-4-en-3-one;
1',2'-dicarbomethoxy-1'-cyclobuteno-(3',4';6α,7α)-17β-hydroxyandrost-4-en-3-one; and
1',2'-dicarbomethoxy-1'-cyclobuteno-(3',4';6α,7α)-17β-hydroxy-19-norandrost-4-en-3-one.

Utilizing 17α-methyl-17β-hydroxy-19 - norandrosta-4,6-dien-3-one but substituting the following acetylenes for dimethyl acetylenedicarboxylate, there are obtained the corresponding cyclobuteno-(3',4';6α,7α) steroids, namely
Dicyano acetylene:
  1',2' - dicyano - 1' - cyclobuteno - (3',4';6α,7α) - 17α-methyl-17β-hydroxy-19-norandrost-4-en-3-one
Cyano acetylene:
  1'-cyano and 2'-cyano-1'-cyclobuteno-(3',4';6α,7α)-17α-methyl-17β-hydroxy-19-norandrost-4-en-3-one

EXAMPLE 2

1',2'-dicyano-1'-cyclobuteno-(3',4';6α,7α)-androstanes and 19-nor analogs

A mixture of 2 g. of androsta-4,6-diene-3,17-dione in 140 ml. of benzene and 2 g. of dicyano acetylene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-dicyanocyclobuteno-(3',4';6α,7α)-androst-4-ene-3,17-dione which is recrystallized from methanol:methylene chloride.

Utilizing the same procedure, the following starting materials are treated with dicyano acetylene to yield the corresponding 1',2'-dicyano-1'-cyclobuteno - (3',4';6α,7α) final products, namely

| Starting materials | Final products |
|---|---|
| 17α-ethynyl-17β-hydroxy-19-norandrosta-4,6-dien-3-one. | 1',2'-dicyano-1'-cyclobuteno-(3',4'; 6α, 7α)-17α-ethynyl-17β-hydroxy-19-norandrost-4-en-3-one. |
| 17α-vinyl-17β-hydroxy-19-norandrosta-4,6-dien-3-one. | 1',2'-dicyano-1'-cyclobuteno-(3',4'; 6α, 7α)-17α-vinyl-17β-hydroxy-19-norandrost-4-en-3-one. |
| 17α-ethyl-17β-hydroxy-19-norandrosta-4,6-dien-3-one. | 1',2'-dicyano-1'-cyclobuteno-(3',4';6α,7α)-17α-ethyl-17β-hydroxy-19-norandrost-4-en-3-one. |
| 17β-(tetrahydropyran-2'-yloxy)-19-norandrosta-4,6-dien-3-one. | 1',2'-dicyano-1'-cyclobuteno-(3',4';6α,7β)-17β-(tetrahydropyran-2'-yloxy)-19-norandrost-4-en-3-one. |
| 6-chloro-17α-methyl-17β-hydroxyandrosta-4,6-dien-3-one. | 1',2'-dicyano-1'-cyclobuteno-(3',4';6α,7α)-6β-chloro-17α-methyl-17β-hydroxyandrost-4-en-3-one. |
| 6-fluoro-17β-acetoxyandrosta-4,6-dien-3-one. | 1',2'-dicyano-1'-cyclobuteno-(3',4';6α,7α)-6β-fluoro-17β-acetoxyandrost-4-en-3-one. |
| 6-methyl-17β-hydroxy-19-norandrosta-4,6-dien-3-one. | 1',2'-dicyano-1'-cyclobuteno-(3',4';6α,7α)-6β-methyl-17β-hydroxy-19-norandrost-4-en-3-one. |

EXAMPLE 3

Cyclobuteno-(3',4';6α,7α)-androstanes and 19-nor analogs

A mixture of 2 g. of 17α-methyl-17β-hydroxy-19-norandrosta-4,6-dien-3-one and 2 g. of diethyl acetylenedicarboxylate in 140 ml. of benzene is irradiated with a 200 watt Hanau high pressure mercury vapor lamp with a Pyrex filter at room temperature for a period of three hours. At the end of the reaction, the mixture is evaporated in vacuo to dryness, chromatographed on silica and the product eluted with ethyl acetate:benzene to yield 1',2'-dicarboethoxycyclobuteno-(3',4';6α,7α) - 17α - methyl-17β-hydroxy - 19 - norandrost-4-en-3-one which is recrystallized from methanol:methylene chloride.

Utilizing the same procedure, the following starting materials are treated with the acetylenes indicated, to afford the following final products, namely

| Starting material | Acetylenes | Final products |
|---|---|---|
| 17β-hydroxyandrosta-4,6-dien-3-one. | Acetylene dicarboxylic acid. | 1',2'-dicarboxy-1'-cyclobuteno-(3'4';6α,7α)-17β-hydroxyandrost-4-en-e-one. |
| 17α-ethynyl-17β-hydroxy-19-norandrosta-4,6-dien-3-one. | Ethyl propiolate. | 1'-carboethoxy and 2'-carboethoxy-1'-cyclobuteno-(3',4';6α,7α)-17α-ethynyl-17β-hydroxy-19-norandrost-4-en-3-one. |
| 17β-acetoxyandrosta-4,6-dien-3-one. | Dimethyl-acetylene-dicarboxylate. | 1',2'-dicarbomethoxy-1'-cyclobuteno-(3',4'; 6α,7α)-17β-acetoxyandrost-4-en-3-one. |

EXAMPLE 4

Cyclobuteno-(3',4';6α,7α)-pregnanes and 19-nor analogs

A mixture of 2 g. of 6-dehydroprogesterone and 2 g. of dimethylacetylenedicarboxylate in 140 ml. of benzene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-dicarbomethoxy-1'-cyclobuteno-(3',4';6α,7α)-pregn - 4 - ene-3,20-dione which is recrystallized from methanol:methylene chloride.

Utilizing the same procedure, the following starting materials are treated with the acetylene listed to afford the following final products, namely

| Starting materials | Acetylenes | Final products |
|---|---|---|
| 1α-,2α-methylenepregna-4'6-diene-3,20-dione. | Dicyano acetylene. | 1',2'-dicyano-1'-cyclobuteno-(3',4';6α,7α)-1α,2α-methylenepregn-4-ene-3,20-dione. |
| 6-chloro-17α-acetoxypregna-4,6-diene-3,20-dione. | ...do... | 1',2'-dicyano-1'-cyclobuteno-(3',4';6α,7α)-6β-chloro-17α-acetoxypregn-4-ene-3,20-dione. |
| 6-methyl-17α-acetoxypregna-4,6-diene-3,20-dione. | ...do... | 1',2'-dicyano-1'-cyclobuteno-(3',4';6A,7A)-6β-methyl-17A-acetoxypregn-4-ene-3,20-dione. |
| 16α,17α-isopropylidenedioxypregna-4,6-diene-3,20-dione. | Diethyl acetylene-dicarboxylate. | 1',2'-dicarboethoxy-1'-cyclobuteno-(3',4';6α,7α)-16α,17α-isopropylidene-dioxypregn-4-ene-3,20-dione. |
| 16α-methyl-17α-acetoxy-19-norpregna-4,6-diene-3,20-dione. | Cyano acetylene. | 1'-cyano and 2'-cyano-1'-cyclobuteno-(3',4';6α,7α)-16α-methyl-17α-acetoxy-19-norpregn-4-ene-3,20-dione. |
| 17α-acetoxypregna-4,6-diene-3,20-dione. | Dimethyl acetylene-dicarboxylate. | 1'2'-dicarbomethoxy-1'-cyclobuteno-(3',4'; 6α,7α)-17α-acetoxypregn-4-ene-3,20-dione. |

EXAMPLE 5

Cyclobuteno-(3',4';6α,7α)-pregnanes

A mixture of 2 g. of 6-fluoro-19-norpregna-4,6-diene-3,20-dione and 2 g. of diethyl acetylenedicarboxylate in 140 ml. of benzene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-dicarboethoxy-1'-cyclobuteno-(3',4';6α,7α)-6β-fluoro - 19 - norpregn-4-ene-3,20-dione which is recrystallized from methanol:methylene chloride.

Utilizing the same procedure, the following starting materials are treated with the acetylenes listed to afford the following final products, namely

| Starting materials | Acetylenes | Final products |
|---|---|---|
| 16α,17α-acetonide-19-norpregna-4,6-diene-3,20-dione. | Ethyl propiolate. | 1'-carboethoxy and 2'-carboethoxy-1'-cyclobuteno-(3',4'; 6α,7α)-16α,17α-acetonide-19-norpregn-4-ene-3,20-dione. |
| 6-chloro-17α-acetoxy-pregna-4,6-diene-3,20-dione. | Acetylene-dicarboxylic acid. | 1',2'-dicarboxy-1'-cyclobuteno-(3',4'; 6α,7α)-6β-chloro-17α-acetoxypregn-4-ene-3,20-dione. |
| 6-methyl-17α-acetoxy-19-norpregna-4,6-diene-3,20-dione. | Diethyl acetylenedicarboxylate. | 1',2'-dicarboethoxy-1'-cyclobuteno-(3',4'; 6α,7α)-6β-methyl-17α-acetoxy-19-norpregn-4-ene-3,20-dione. |
| 17α-acetoxy-19-norpregna-4,6-diene-3,20-dione. | Dimethyl acetylenedicarboxylate. | 1',2'-dicarbomethoxy-1'-cyclobuteno-(3',4'; 6α,7α)-17α-acetoxy-19-norpregn-4-ene-3,20-dione. |
| 6-fluoro-17α-hydroxypregna-4,6-diene-3,20-dione. | Propiolic acid. | 1'-carboxy and 2'-carboxy-1'-cyclobuteno-(3',4'; 6α,7α)-6β-fluoro-17α-hydroxypregn-4-ene-3,20-dione. |

EXAMPLE 6

A mixture of 2 g. of 6-dehydrocortisol and 2 g. of dimethyl acetylenedicarboxylate in 140 ml. of benzene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-dicarbomethoxy - 1' - cyclobuteno-(3',4'; 6α,7α)-11β,17α,21-trihydroxypregn - 4 - ene-3,20-dione which is recrystallized from methanol:methylene chloride.

Utilizing the same procedure, the following starting materials are treated with dimethyl acetylenedicarboxylate to yield the corresponding 1',2'-dicarbomethoxy-1'-cyclobuteno-(3',4';6α,7α) final products, namely

| Starting materials | Final products |
|---|---|
| 9α-fluoro-11β,17α,21-trihydroxy-16α-methylpregna-4,6-diene-3,20-dione. | 1',2'-dicarbomethoxy-1'-cyclobuteno-(3',4'; 6α,7α)-9α-fluoro-11β,17α,21-trihydroxy-16α-methylpregn-4-ene-3,20-dione. |
| 9α-fluoro-11β-hydroxy-16α,17α-acetonide-21-acetoxypregna-4,6-diene-3,20-dione. | 1',2'-dicarbomethoxy-1'-cyclobuteno-(3',4'; 6α,7α)-9α-fluoro-11β-hydroxy-16α,17α-acetonide-21-acetoxy-pregn-4-ene-3,20-dione. |
| 11β,21-dihydroxypregna-4,6-diene-3,20-dione. | 1',2'-dicarbomethoxy-1'-cyclobuteno-(3',4'; 6α,7α)-11β,21-dihydroxypregn-4-ene-3,20-dione. |
| 9α-fluoro-11β,21-dihydroxy-pregna-4,6-diene-3,20-dione. | 1',2'-dicarbomethoxy-1'-cyclobuteno-(3',4'; 6α,7α)-9α-fluoro-11β,21-dihydroxypregn-4-ene-3,20-dione. |
| 11β,17α,21-trihydroxypregna-4,6-diene-3,20-dione. | 1',2'-dicarbomethoxy-1'-cyclobuteno-(3',4';6α,7α)-11β,17α,21-trihydroxypregn-4-ene-3,20-dione. |
| 11β,17α,21-trihydroxy-16α-methylpregna-4,6-diene-3,20-dione. | 1',2'-dicarbomethoxy-1'-cyclobuteno-(3',4'; 6α,7α)-11β,17α-21-trihydroxy-16α-methylpregn-4-ene-3,20-dione. |
| 11β,21-dihydroxy-16α-methyl-pregna-4,6-diene-3,20-dione. | 1',2'-dicarbomethoxy-1'-cyclobuteno-(3',4'; 6α,7α)-11β,21-dihydroxy-16α-methyl-pregn-4-ene-3,20-dione. |
| 9α-fluoro-11α,21-dihydroxy-16β-methylpregna-4,6-diene-3,20-dione. | 1',2'-dicarbomethoxy-1'-cyclobuteno-(3',4'; 6α,7α)-9α-fluoro-11β,21-dihydroxy-16α-methyl-pregn-4-ene-3,20-dione. |

EXAMPLE 7

Cyano and dicyano corticoids

A mixture of 2 g. of 6-dehydrocortisol and 2 g. of dicyano acetylene in 140 ml. of benzene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2'-dicyano - 1' - cyclobuteno - (3',4';6α,7α) - 11β,17α,21 - trihydroxypregn-4-ene-3,20-dione which is recrystallized from methanol:methylene chloride.

Utilizing the same procedure, the following starting materials are treated with the acetylenes listed to afford the following final products:

| Starting materials | Acetylenes | Final products |
|---|---|---|
| 9α-fluoro-11β,17α-dihydroxy-16α-methyl-21-acetoxypregna-4,6-diene-3,20-dione. | Dicyano acetylene. | 1',2'-dicyano-1'-cyclobuteno-(3',4';6α,7α)-9α-fluoro-11β,17α-dihydroxy-16α-methyl-21 acetoxypregn-4-ene-3,20-dione. |
| 11β-hydroxy-16α,17α-acetonide-21-acetoxypregna-4,6-diene-3,20-dione. | Cyano acetylene. | 1'-cyano and 2'-cyano-1'-cyclobuteno-(3',4'; 6α,7α)-11β-hydroxy-16α,17A-acetonide-21-acetoxypregn-4-ene-3,20-dione. |
| 6-dehydrocortisol. | Dicyano acetylene. | 1',2'-dicyano-1'-cyclobuteno-(3',4'; 6α,7α)-11β,17α,21-trihydroxypregn-4-ene-3,20-dione. |

EXAMPLE 8

Carboethoxy and dicarboethoxy corticoids

A mixture of 2 g. of 9α-fluoro-11β,17α,21-trihydroxy-16α-methylpregna-4,6-diene-3,20-dione and 2 g. of acetylene dicarboxylic acid in 140 ml. of benzene is irradiated with a 200 watt Hanau high pressure mercury vapor lamp with a Pyrex filter at room temperature for a period of 3 hours. At the end of the reaction, the mixture is evaporated in vacuo to dryness, chromatographed on silica and the product eluted with ethyl acetate:benzene to yield 1',2' - dicarboxy - 1' - cyclobuteno - (3', 4'; 6α,7α) - 9α-fluoro - 11β,17α,21 - trihydroxy - 16α - methylpregn - 4-ene-3,20-dione which is recrystallized from methanol: methylene chloride.

Utilizing the same procedure, the following starting materials are treated with the acetylenes listed to afford the following final products:

| Starting materials | Acetylenes | Final products |
|---|---|---|
| 9α-fluoro-11β,17α-dihydroxy-16α-methyl-21-acetoxypregna-4,6-diene-3,20-dione. | Ethyl propiolate. | 1'-carboethoxy and 2'-carboethoxy-1'-cyclobuteno-(3',4'; 6α,7α)-9α-fluoro-11β,17α-dihydroxy-16α-methyl-21-acetoxypregn-4-ene 3,20-dione. |
| 6-dehydrocortisol. | Diethyl acetylenedicarboxylate. | 1',2'-dicarboethoxy-1'-cyclobuteno-(3',4'; 6α,7α)-11β,17α,21-trihydroxypregn-4-ene-3,20-dione. |
| 11β-hydroxy-16α,17α-acetonide-21-acetoxypregna-4,6-diene-3,20-dione. | Dimethyl acetylenedicarboxylate. | 1',2'-dicarbomethoxy-1'-cyclobuteno-(3',4'; 6α,7α)-11β-hydroxy-16α,17α-acetonide-21-acetoxypregn-4-ene-3,20-dione. |

EXAMPLE 9

$\Delta^{1,4}$-dienes

A mixture of 0.5 g. of 1',2'-dicarbomethoxy-1'-cyclobuteno - (3',4';6α,7α) - 11β,17α,21 - trihydroxypregn - 4-ene-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 1',2'-dicarbomethoxy-1'-cyclobuteno- (3',4';6α,7α) - 11β,17α,21 - trihydroxypregna - 1,4 - diene-3,20-dione which is further purified by recrystallization from acetone:hexane.

Utilizing the same procedure, the 1',2'-dicarbomethoxy-1'-cyclobuteno-(3',4';6α,7α) steroids listed as final products in Example 6 are converted to the corresponding Δ¹,⁴-dienes. Notably among these are the following:

1',2'-dicarbomethoxy-1'-cyclobuteno-(3',4';6α,7α)-9α-fluoro-11β,17α,21-trihydroxy-16α-methylpregna-1,4-diene-3,20-dione;
1',2'-dicarbomethoxy-1'-cyclobuteno-(3',4';6α,7α)-9α-fluoro-11β-hydroxy-16α,17α-acetonide-21-acetoxypregna-1,4-diene-3,20-dione;
1',2'-dicarbomethoxy-1'-cyclobuteno-(3',4';6α,7α)-11β,21-dihydroxypregna-1,4-diene-3,20-dione;
1',2'-dicarbomethoxy-1'-cyclobuteno-(3',4';6α,7α)-9α-fluoro-11β,21-dihydroxypregna-1,4-diene-3,20-dione;
1',2'-dicarbomethoxy-1'-cyclobuteno-(3',4';6α,7α)-11β,17α,21-trihydroxypregna-1,4-diene-3,20-dione;
1',2'-dicarbomethoxy-1'-cyclobuteno-(3',4';6α,7α)-11β,17α,21-trihydroxy-16α-methylpregna-1,4-diene-3,20-dione;
1',2'-dicarbomethoxy-1'-cyclobuteno-(3',4';6α,7α)-11β,21-dihydroxy-16α-methylpregna-1,4-diene-3,20-dione; and
1',2'-dicarbomethoxy-1'-cyclobuteno-(3',4';6α,7α)-9α-fluoro-11β,21-dihydroxy-16α-methylpregna-1,4-diene-3,20-dione.

In a similar manner, the substituted 1'-cyclobuteno-(3',4';6α,7α)-androstane and pregnane final products of Examples 1, 2, 3, 4, 5, 7, and 8, are converted to the corresponding Δ¹,⁴-diene analogs.

The novel cyclobuteno androstanes of Formula A are anabolic agents having a favorable anabolic-androgenic ratio and are useful post-operatively and in geriatrics to enhance tissue build-up. In addition the cyclobuteno androstanes bearing a 17α-ethynyl vinyl or ethyl substituent, are progestational agents and useful in oral contraception. The novel cyclobuteno pregnanes of Formula B are progestational agents and are useful in fertility control and the management of various menstrual disorders. In addition, the cyclobuteno pregnanes of Formula B demonstrate hormonal properties characteristic of anti-androgenic, anti-gonadotrophic and anti-estrogenic agents. The novel cyclobuteno pregnanes of Formula C are cortical hormones with high anti-inflammatory and low catabolic activities and are useful in the treatment of rheumatoid arthritis, contact dermatitis, allergies and the like. The cyclobuteno steroids of the present invention are administered via usual routes, i.e. orally, topically or parenterally in pharmaceutically acceptable compositions at dosage rates of from 0.5γ to 5 mg./kg./day. However, dosage rates below or above this range can also be used; the most favorable dosage rate and administration route being conditioned upon the purpose for which it is administered and the response thereto.

What is claimed is:

1. A cyclobuteno-(3',4';6α,7α) steroid of the androstane series having the following formula:

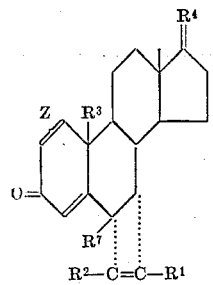

wherein Z is a carbon-carbon single bond or a carbon-carbon double bond;

one of $R^1$ and $R^2$ is hydrogen, the other being carboxy, carboalkoxy or cyano, or $R^1$ and $R^2$ are the same and are selected from carboxy, carboalkoxy or cyano;
$R^3$ is hydrogen or methyl, $R^3$ being methyl when Z is the carbon-carbon double bond;
$R^4$ is keto or the group

in which $R^5$ is hydrogen, tetrahydropyran-2-yl, tetrahydrofuran-2-yl or a hydrocarbon carboxylic acyl group of less than 12 carbon atoms and $R^6$ is hydrogen, lower alkyl, alkenyl, alkynyl or haloalkynyl; and $R^7$ is hydrogen, chloro, fluoro or methyl.

2. A cyclobuteno-(3',4';6α,7α) steroid according to claim 1 wherein Z is a carbon-carbon single bond; each of $R^1$ and $R^2$ is carbomethoxy; $R^3$ is hydrogen; $R^4$ is the group

in which each of $R^5$ and $R^6$ is hydrogen; and $R^7$ is hydrogen.

3. A cyclobuteno-(3',4';6α,7α) steroid according to claim 1 wherein Z is a carbon-carbon single bond; each of $R^1$ and $R^2$ is carbomethoxy; $R^3$ is methyl; $R^4$ is the group

in which $R^5$ is hydrogen and $R^6$ is ethynyl; and $R^7$ is hydrogen.

4. A cyclobuteno-(3',4';6α,7α) steroid according to claim 1 wherein Z is a carbon-carbon single bond; each of $R^1$ and $R^2$ is carbomethoxy; $R^3$ is hydrogen; $R^4$ is the group

in which $R^5$ is hydrogen and $R^6$ is ethynyl; and $R^7$ is hydrogen.

5. A cyclobuteno-(3',4';6α,7α) steroid according to claim 1 wherein Z is a carbon-carbon single bond; each of $R^1$ and $R^2$ is carbomethoxy; $R^3$ is methyl; $R^4$ is the group

in which each of $R^5$ and $R^6$ is hydrogen; and $R^7$ is hydrogen.

6. A cyclobuteno-(3',4';6α,7α) steroid according to claim 1 wherein Z is a carbon-carbon single bond; each of $R^1$ and $R^2$ is carbomethoxy; $R^3$ is hydrogen; $R^4$ is the group

in which $R^5$ is hydrogen and $R^6$ is methyl; and $R^7$ is hydrogen.

7. A cyclobuteno-(3',4';6α,7α) steroid according to claim 1 wherein Z is a carbon-carbon single bond; each of $R^1$ and $R^2$ is carbomethoxy; $R^3$ is methyl; $R^4$ is the group

in which $R^5$ is hydrogen and $R^6$ is methyl; and $R^7$ is hydrogen.

8. A cyclobuteno-(3′,4′;6α,7α) steroid of the pregnane series have the following formula:

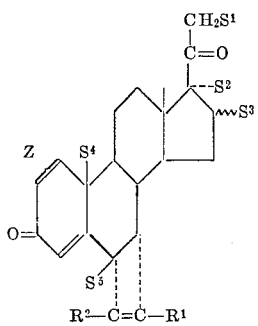

wherein Z is a carbon-carbon single bond, a carbon-carbon double bond or a 1α,2α-methylene group;
one of $R^1$ and $R^2$ is hydrogen, the other being carboxy, carboalkoxy or cyano, or $R^1$ and $R^2$ are the same and are selected from carboxy, carboalkoxy or cyano;
$S^1$ is hydrogen, chloro or fluoro;
$S^2$ is hydrogen, hydroxy, lower alkyl or a hydrocarbon carboxylic acyloxy group containing less than 12 carbon atoms;
$S^3$ is hydrogen, α-methyl, β-methyl, α-hydroxy or methylene;
$S^2$ and $S^3$ together is the group

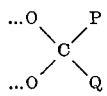

in which P is hydrogen or lower alkyl and Q is hydrogen, lower alkyl or aryl of up to eight carbon atoms;
$S^4$ is hydrogen or methyl, $S^4$ being methyl when Z is the carbon-carbon double bond; and
$S^5$ is hydrogen, chloro, fluoro or methyl.

9. A cyclobuteno-(3′,4′;6α,7α) steroid according to claim 8 wherein Z is a carbon-carbon single bond; each of $R^1$ and $R^2$ is carbomethoxy; $S^1$ is hydrogen; $S^2$ is acetoxy; $S^3$ is hydrogen; $S^4$ is methyl; and $S^5$ is hydrogen.

10. A cyclobuteno-(3′,4′;6α,7α) steroid according to claim 8 wherein Z is a carbon-carbon single bond; each of $R^1$ and $R^2$ is carbomethoxy; each of $S^1$, $S^2$, and $S^3$ is hydrogen; $S^4$ is methyl; and $S^5$ is hydrogen.

11. A cyclobuteno-(3′,4′;6α,7α) steroid according to claim 8 wherein Z is a carbon-carbon single bond; each of $R^1$ and $R^2$ is carbomethoxy; $S^1$ is hydrogen; $S^2$ is acetoxy; and each of $S^3$, $S^4$ and $S^5$ is hydrogen.

12. A cyclobuteno-(3′,4′;6α,7α) steroid according to claim 8 wherein Z is a carbon-carbon single bond; each of $R^1$ and $R^2$ is carbomethoxy; and each of $S^1$, $S^2$, $S^3$, $S^4$, and $S^5$ is hydrogen.

13. A cyclobuteno-(3′,4′;6α,7α) steroid of the pregnane series having the following formula:

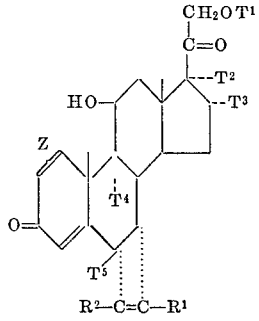

wherein Z is a carbon-carbon single bond or a carbon-carbon double bond;
one of $R^1$ and $R^2$ is hydrogen, the other being carboxy, carboalkoxy or cyano, or $R^1$ and $R^2$ are the same and are selected from carboxy, carboalkoxy or cyano;

$T^1$ is hydrogen, tetrahydropyran-2-yl, tetrahydrofuran-2-yl or a hydrocarbon carboxylic acyl group containing less than 12 carbon atoms;
$T^2$ is hydrogen, hydroxy or a hydrocarbon carboxylic acid acyloxy group containing less than 12 carbon atoms;
$T^3$ is hydrogen, hydroxy or methyl;
$T^2$ and $T^3$ together is the group

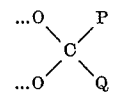

in which P is hydrogen or lower alkyl and Q is hydrogen, lower alkyl or aryl of up to eight carbon atoms;
$T^4$ is hydrogen or fluoro; and
$T^5$ is hydrogen, chloro, fluoro or methyl.

14. A cyclobuteno-(3′,4′;6α,7α) steroid according to claim 13 wherein Z is a carbon-carbon single bond; each of $R^1$ and $R^2$ is carbomethoxy; $T^1$ is hydrogen; $T^2$ is hydroxy; $T^3$ is hydrogen; and $T^5$ is hydrogen.

15. A cyclobuteno-(3′,4′;6α,7α) steroid according to claim 13 wherein Z is a carbon-carbon single bond; each of $R^1$ and $R^2$ is carbomethoxy; each of $T^1$ and $T^2$ is hydrogen; $T^3$ is α-methyl; and $T^5$ is hydrogen.

16. A cyclobuteno-(3′,4′;6α,7α) steroid according to claim 13 wherein Z is a carbon-carbon double bond; each of $R^1$ and $R^2$ is carbomethoxy; each of $T^1$, $T^2$, $T^3$, and $T^5$ is hydrogen.

17. A cyclobuteno-(3′,4′;6α,7α) steroid according to claim 13 wherein Z is a carbon-carbon single bond; each of $R^1$ and $R^2$ is carbomethoxy; $T^1$ is hydrogen; $T^2$ is hydroxy; $T^3$ is hydrogen; and $T^5$ is hydrogen.

18. A cyclobuteno-(3′,4′;6α,7α) steroid according to claim 13 wherein Z is a carbon-carbon single bond; each of $R^1$ and $R^2$ is carbomethoxy; $T^1$ is hydrogen; $T^2$ is hydroxy; $T^3$ is α-methyl; and $T^5$ is hydrogen.

19. A cyclobuteno-(3′,4′;6α,7α) steroid according to claim 13 wherein Z is a carbon-carbon single bond; each of $R^1$ and $R^2$ is carbomethoxy; $T^1$ is hydrogen; $T^2$ and $T^3$ together is the group

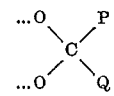

in which each of P and Q is methyl; and $T^5$ is hydrogen.

20. A cyclobuteno-(3′,4′;6α,7α) steroid according to claim 13 wherein Z is a carbon-carbon double bond; each of $R^1$ and $R^2$ is carbomethoxy; $T^1$ is hydrogen; $T^2$ is hydroxy; $T^3$ is α-methyl; and $T^5$ is hydrogen.

21. A cyclobuteno-(3′,4′;6α,7α) steroid according to claim 13 wherein Z is a carbon-carbon double bond; each of $R^1$ and $R^2$ is carbomethoxy; $T^1$ is hydrogen; $T^2$ and $T^3$ together is the group

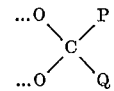

in which each of P and Q is methyl; and $T^5$ is hydrogen.

22. A process for the preparation of a 1′-cyclobuteno-(3′,4′;6α,7α) steroid of the androstane series which comprises irradiating a mixture of a 3-keto-$\Delta^{4,6}$-diene of the androstane series and an acetylene of the formula $R^1C{\equiv}CR^2$ wherein one of $R^1$ and $R^2$ is hydrogen, the other being carboxy, carboalkoxy or cyano, or $R^1$ and $R^2$ are the same and are selected from carboxy, carboalkoxy or cyano in an inert solvent with ultraviolet light of a wave length of about 270 to about 330 m$\mu$ to obtain the corresponding 1′-cyclobuteno-(3′,4;6α,7α) steroid of the androstane series.

23. A process for the preparation of a 1'-cyclobuteno-(3',4;6α,7α) steroid of the pregnane series which comprises irradiating a mixture of a 3-keto-$\Delta^{4,6}$-diene of the pregnane series and an acetylene of the formula $R^1C\equiv CR^2$ wherein one of $R^1$ and $R^2$ is hydrogen, the other being carboxy, carboalkoxy or cyano, or $R^1$ and $R^2$ are the same and are selected from carboxy, carboalkoxy or cyano in an inert solvent with ultraviolet light of a wave length of about 270 to about 330 mμ to obtain the corresponding 1'-cyclobuteno-(3',4;6α,7α) steroid of the pregnane series.

References Cited

Rubin et al., Journ. Org. Chem., vol. 29, January 1964, pp. 68-74.

LEWIS GOTTS, Primary Examiner

ETHEL G. LOVE, Assistant Examiner

U.S. Cl. X.R.

204—158; 260—397, 999